United States Patent

Miyake et al.

[11] Patent Number: 5,911,906
[45] Date of Patent: Jun. 15, 1999

[54] ANTIFREEZE/COOLANT COMPOSITION

[75] Inventors: Yuji Miyake; Yasuaki Mori, both of Gifu-Ken, Japan

[73] Assignee: CCI Co., Ltd., Seki, Japan

[21] Appl. No.: 09/037,456

[22] Filed: Mar. 10, 1998

[51] Int. Cl.⁶ ...................................................... C09K 5/00
[52] U.S. Cl. ................................................ 252/76; 252/79
[58] Field of Search ......................................... 252/76, 79

[56] References Cited

U.S. PATENT DOCUMENTS

| | | | |
|---|---|---|---|
| 4,647,392 | 3/1987 | Darden et al. | 252/75 |
| 5,711,894 | 1/1998 | Miyake et al. | 252/76 |

FOREIGN PATENT DOCUMENTS

| | | |
|---|---|---|
| 61-184810 | 8/1986 | Japan. |
| 8-269750 | 10/1996 | Japan. |

*Primary Examiner*—Christine Skane
*Attorney, Agent, or Firm*—James P. Hanrath

[57] ABSTRACT

An antifreeze/coolant composition is disclosed, which can effectively inhibit corrosion of metals, particularly cast aluminum and cast iron, and can also inhibit cavitation damage to metals in an engine cooling system. The antifreeze/coolant composition comprises a glycol as the chief ingredient, 0.1–0.5% by weight of at least one ingredient selected from among $C_6$–$C_{12}$ aliphatic monobasic acids and their salts, and 0.1–0.5% by weight of at least one ingredient selected from among alkoxybenzoic acids having $C_1$–$C_5$ alkoxy and their salts.

6 Claims, 1 Drawing Sheet

ANTIFREEZE/COOLANT COMPOSITION

BACKGROUND OF THE INVENTION

1. Technical Field

This invention generally relates to an antifreeze/coolant composition. More particularly, this invention relates to an antifreeze/coolant composition which excels in corrosion inhibition of metals used in a cooling system for an engine, particularly cast aluminum and cast iron, as well as in inhibition of "cavitation" damage.

2. Background Art

A cooling system for an internal-combustion engine generally uses various metals such as aluminum, cast aluminum, cast iron, steel, brass, solder and copper, which are subject to corrosion over time by water or moist air. In order to inhibit metal corrosion, a metal corrosion inhibiting solution such as an antifreeze/coolant composition containing a metal corrosion inhibitor is generally blended in the cooling liquid or water in the cooling system.

An antifreeze/coolant composition as well as cooling water inherently contains some air dissolved therein, which will generate air bubbles or cavitation within the cooling system due chiefly to local fluidic pressure difference and/or vibrations generated through the cooling system. Metal portions, particularly iron parts, of the cooling system can be damaged or corroded by the bubbles, which is called "cavitation damage".

Conventionally, nitrite is blended in antifreeze/coolant compositions to inhibit generation of cavitation. It is assumed that nitrite blended in the antifreeze/coolant compositions provides protection cover on the metal parts.

Nitrite however is known to produce nitrosoamine, a carcinogenic substance, by chemical reaction with amine salts in the cooling liquid. Although use of nitrite in antifreeze/coolant compositions has given rise to controversy, no other effective and safe substitute to inhibit cavitation existed.

Accordingly, it is an object of the present invention to provide an antifreeze/coolant composition which effectively and safely inhibits both corrosion of metals, particularly cast aluminum and cast iron, and generation of cavitation in a cooling system.

SUMMARY OF THE INVENTION

The antifreeze/coolant composition of the present invention comprises a glycol as the chief ingredient, about 0.1–5.0% by weight of at least one ingredient selected from the group consisting of $C_6$–$C_{12}$ aliphatic monobasic acids and their salts, and about 0.1–5.0% by weight of at least one ingredient selected from the group consisting of alkoxybenzoic acids having $C_1$–$C_5$ alkoxy and their salts.

The antifreeze/coolant composition of the present invention may further comprise about 0.05–1.0% by weight of at least one triazole. Optionally, the antifreeze/coolant composition of the present invention may be characterized in that no operative amount of amine salts or borates are included.

DETAILED DESCRIPTION OF THE PREFFERRED EMBODIMENT

Figure 1:
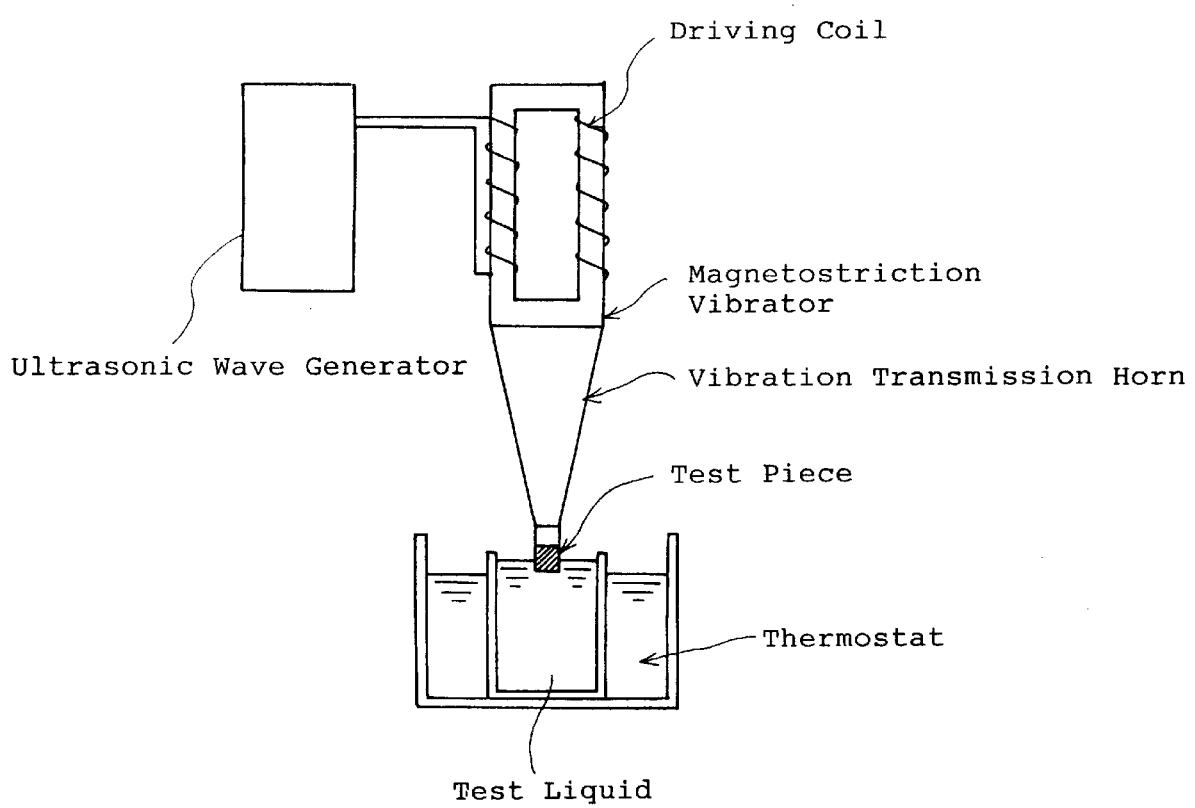
FIG. 1 schematically shows an apparatus for studying the cavitation inhibitory property of compositions.

The antifreeze/coolant composition of the present invention comprises a glycol as the main ingredient, such as ethylene glycol, propylene glycol, 1,3 butylene glycol, hexylene glycol, diethylene glycol or glycerin, among which ethylene glycol and propylene glycol are preferred for their chemical stability and low cost.

The composition further comprises about 0.1–0.5% by weight of at least one ingredient selected from the group consisting of $C_6$–$C_{12}$ aliphatic monobasic acids and their salts and about 0.1–5.0% by weight of at least one ingredient selected from the group consisting of alkoxybenzoic acids having $C_1$–$C_5$ alkoxy and their salts.

Here, $C_6$–$C_{12}$ aliphatic monobasic acids and their salts individually have an excellent aluminum and iron corrosion inhibitory property, and in cooperation with at least one ingredient selected from the group consisting of alkoxybenzoic acids having $C_1$–$C_5$ alkoxy and their salts can excellently inhibit cavitation in a cooling system.

Such $C_6$–$C_{12}$ aliphatic monobasic acids maybe hexanoic acid, heptanoic acid, octanoic acid, nonanoic acid, decanoic acid, undecanoic acid or dodecanoic acid. Their salts may be their alkali metal salts, ammonium salts or amine salts, among which alkali metal salts are preferred. Preferred alkali metal salts are sodium salts and potassium salts. A plurality of these chemicals may be blended in the antifreeze/coolant composition of the present invention.

The $C_6$–$C_{12}$ aliphatic monobasic acids and/or their salts are selectively blended in the antifreeze/coolant composition of the present invention in a total amount of about 0.1–5.0% by weight. Less than that range will prove insufficient in prohibition of metal corrosion and cavitation while more than that range will merely be uneconomical.

Alkoxybenzoic acids having $C_1$–$C_5$ alkoxy and their salts can individually inhibit metal corrosion, particularly aluminum and iron corrosion, as well as prevent cavitation in a cooling system in cooperation with at least one ingredient selected from the group of $C_6$–$C_{12}$ aliphatic monobasic acids and their salts. In addition, they can individually inhibit precipitation with hard water minerals in the cooling liquid.

Such alkoxybenzoic acids having $C_1$–$C_5$ alkoxy may be p-ethoxybenzoic acid or p-methoxybenzoic acid. The salts of alkoxybenzoic acids having $C_1$–$C_5$ alkoxy may be their alkali metal salts, ammonium salts and amine salts, among which alkali metal salts such as sodium salts and potassium salts are preferred. Such salts may be blended in a plurality.

The alkoxybenzoic acids having $C_1$–$C_5$ alkoxy and/or their salts may be blended singly or in a plurality in the antifreeze/coolant composition of the present invention in a total amount of about 0.1–5.0% by weight. Less than that range will be inefficient in prohibition of metal corrosion and cavitation while over that range will only be uneconomical.

A triazole or triazoles may be additionally blended, which effectively inhibit corrosion of metals, particularly copper and aluminum in a cooling system. Such triazoles may be benzotriazol, tolyltriazol, 4-phenyl-1,2,3-triazole, 2-naphthotriazol or 4-nitrobenzotriazol.

The triazole or triazoles may be blended in an amount of about 0.05–1.0% by weight. Less than that range will be insufficient in prohibition of metal corrosion while more than that range will only be uneconomical.

The antifreeze/coolant composition of the present invention may optionally be characterized by the absence of certain ingredients, namely amine salts or borates. Generation of nitrosoamine in the cooling liquid will be prevented by the absence of amine salts, while the absence of borates will contribute to lessen corrosion of aluminum and aluminum alloys.

The antifreeze/coolant composition of the present invention may optionally and selectively comprise an antifoam and/or colorant, and/or a conventional metal corrosion inhibitor or inhibitors such as molybdate, tungstate, sulfate, nitrate, mercaptobenzothiazol, or their alkali metal salts.

Cavitation damage tests were conducted on Embodiment 1 and Comparisons 1 and 2 to study various antifreeze/coolant compositions in comparison using a magnetostriction vibrator schematically shown in FIG. 1. The composition of Embodiment 1 was prepared according to the present invention and the compositions of Comparisons 1 and 2 were conventional compositions. Their respective ingredients are given in Table 1.

TABLE 1

| Ingredient | Emb. 1 | Com. 1 | Com. 2 |
| --- | --- | --- | --- |
| Heptanoic Acid | 3.00 | 3.00 | — |
| P-Methoxybenzoic Acid | 1.00 | — | 1.00 |
| Tolyltriazol | 0.30 | 0.20 | 0.30 |
| Potassium Hydroxide | 1.68 | 1.72 | 0.39 |
| Ethylene Glycol | 92.02 | 91.83 | 96.31 |
| Water | 2.00 | 2.00 | 2.00 |

("Emb." stands for Embodiment, and "Com." stands for Comparison)

The test conditions are given in Table 2.

TABLE 2

| Item | Condition |
| --- | --- |
| Frequency | 19 KHz |
| Amplitude | 30 micro m |
| Test Pieces | FC200 (cast iron) |
| Shape/Size | Circular Disk/16 mm D |
| Weight | About 14 g |
| Concentration | 20% JIS Water Dilution |
| Amount | 50 ml |
| Temperature | 50° C. |
| Depth | 4 mm |

The test results are given in Table 3.

TABLE 3

|  | Emb. 1 | Com. 1 | Com. 2 |
| --- | --- | --- | --- |
| Weight Reduction (mg) | 55.20 | 122.20 | 243.60 |

As Table 3 clearly shows the weight reductions of Embodiment 1 was far smaller than those of Comparisons 1 and 2, showing that the composition according to Embodiment 1 of the present invention is superior in cavitation inhibition to the conventional compositions according to Comparisons 1 and 2.

What is claimed is:

1. An antifreeze/coolant composition comprising a glycol as the main ingredient, about 0.1–5.0% by weight of at least one ingredient selected from the group consisting of $C_6$–$C_{12}$ aliphatic monobasic acids and their salts, and about 0.1–5.0% by weight of at least one ingredient selected from the group consisting of alkoxybenzoic acids having $C_1$–$C_5$ alkoxy and their salts.

2. An antifreeze/coolant composition of claim 1, further comprising about 0.05–1.0% by weight of at least one triazole.

3. An antifreeze/coolant composition of claim 1 in the absence of an operative amount of amine salts or borates.

4. An antifreeze/coolant composition of claim 1 wherein said aliphatic monobasic acid is hexanoic acid, heptanoic acid, octanoic acid, nonanoic acid, decanoic acid, undecanoic acid, or dodecanoic acid.

5. An antifreeze/coolant composition of claim 1 wherein said alkoxybenzoic acid is p-ethoxybenzoic acid or p-methoxybenzoic acid.

6. An antifreeze/coolant composition of claim 2 wherein said triazole is benzotriazol, tolytriazol, 4-phenyl-1,2,3-triazole, 2-nephthotriazol, or 4-nitrobenzotriazol.

* * * * *